(12) United States Patent
Mori et al.

(10) Patent No.: US 7,742,121 B2
(45) Date of Patent: Jun. 22, 2010

(54) LIQUID CRYSTAL DISPLAY APPARATUS AND ELECTRONIC EQUIPMENT

(75) Inventors: Akihiro Mori, Kikuchi-gun (JP); Takuya Sakamoto, Kikuchi-gun (JP)

(73) Assignee: Mitsubishi Denki Kabushiki Kaisha, Chiyoda-ku, Tokyo (JP)

( * ) Notice: Subject to any disclaimer, the term of this patent is extended or adjusted under 35 U.S.C. 154(b) by 417 days.

(21) Appl. No.: 10/973,914

(22) Filed: Oct. 27, 2004

(65) Prior Publication Data

US 2005/0088586 A1 Apr. 28, 2005

(30) Foreign Application Priority Data

Oct. 28, 2003 (JP) ............... 2003-366960

(51) Int. Cl.
  *G02F 1/1333* (2006.01)
  *G02F 1/1335* (2006.01)
(52) U.S. Cl. ............... 349/58; 349/61; 349/62
(58) Field of Classification Search ............ 349/58–65, 349/149–152
See application file for complete search history.

(56) References Cited

U.S. PATENT DOCUMENTS

| | | | |
|---|---|---|---|
| 6,536,914 B2* | 3/2003 | Hoelen et al. | 362/231 |
| 6,742,907 B2* | 6/2004 | Funamoto et al. | 362/625 |
| 6,840,646 B2* | 1/2005 | Cornelissen et al. | 362/606 |
| 6,874,900 B2* | 4/2005 | Hsieh | 362/26 |
| 7,139,046 B2* | 11/2006 | Katahira | 349/58 |
| 2002/0149943 A1* | 10/2002 | Obata | 362/339 |

FOREIGN PATENT DOCUMENTS

| | | |
|---|---|---|
| JP | 58-178389 A | 10/1983 |
| JP | 60-163141 UM | 10/1985 |
| JP | 8-122775 | 5/1996 |
| JP | 9-92886 | 4/1997 |
| JP | 10-006618 | 1/1998 |
| JP | 2000-338486 | 12/2000 |
| JP | 2002-107721 A | 4/2002 |
| JP | 2002-131744 | 5/2002 |
| JP | 2002-162626 | 6/2002 |
| JP | 2003-121655 | 4/2003 |
| JP | 2003-217734 | 7/2003 |

OTHER PUBLICATIONS

Chinese Office Action, dated Aug. 25, 2006, with English-language translation.
Office Action from corresponding Japanese Application No. 2003-366960 mailed Sep. 24, 2008, with English language translation.

* cited by examiner

*Primary Examiner*—David Nelms
*Assistant Examiner*—David Y Chung
(74) *Attorney, Agent, or Firm*—Buchanan Ingersoll & Rooney PC

(57) ABSTRACT

In a liquid crystal display apparatus, it is a liquid crystal display apparatus comprising a liquid crystal panel for forming an image by a video signal from the outside, a light source substrate comprising at least one point-like light source, and a cabinet to which the light source substrate is attached, and light emitted from the point-like light source illuminates the liquid crystal panel and the light source substrate is constructed detachably from the outside of the cabinet in a direction of a surface opposite to a display surface of the liquid crystal panel and thereby the light source substrate is constructed detachably without disassembling the liquid crystal display apparatus.

15 Claims, 13 Drawing Sheets

LIQUID CRYSTAL DISPLAY APPARATUS AND ELECTRONIC EQUIPMENT

BACKGROUND OF THE INVENTION

1. Field of the Invention

The present invention relates to a display apparatus such as a liquid crystal display apparatus, and electronic equipment comprising the display apparatus.

2. Description of the Related Art

Generally, a conventional liquid crystal display apparatus comprising a point-like light source such as an LED light source comprises a light source substrate in which the point-like light source is mounted, an optical waveguide for guiding light from the light source to the display surface side and a cabinet for receiving the light source substrate and the optical waveguide, and has a structure in which the light source substrate is pinched and supported by a substrate support part provided in the cabinet and the optical waveguide in the inside of the cabinet. Therefore, it is unnecessary to use a screw or a double-sided adhesive tape, etc. in order to fix the light source substrate in the substrate support part, so that assembly work of the liquid crystal display apparatus or replacement work or attachment and detachment of the light source substrate can be performed easily (for example, see JP-A-2002-107721).

As described above, in the case of adopting a structure in which the light source substrate is engaged and pinched by the optical waveguide and the cabinet without using a screw or a double-sided adhesive tape in the conventional liquid crystal display apparatus, attachment and detachment of the light source substrate become easy, but even in that case, work for removing a liquid crystal display panel or the optical waveguide is required. That is, when the light source substrate is attached and detached, it is necessary to disassemble the liquid crystal display apparatus itself after the liquid crystal display apparatus is removed from a product resulting in the final form. Therefore, for example, there were problems that when the need to replace the light source substrate arises, the liquid crystal display apparatus is removed from the electronic equipment before and after the replacement work and thereafter disassembly and reassembly work of the liquid crystal display apparatus is required and further with disassembly and reassembly of the liquid crystal display apparatus, display performance decreases due to occurrence of a flaw or intrusion of foreign matter into a display area.

SUMMARY OF THE INVENTION

The invention is implemented in view of the circumstances described above, and an object of the invention is to provide a liquid crystal display apparatus in which with respect to a liquid crystal display apparatus using a point-like light source, a light source substrate can be replaced easily and a decrease in display quality is not caused with the replacement work, and electronic equipment using the liquid crystal display apparatus.

A liquid crystal display apparatus according to the invention is a liquid crystal display apparatus comprising a liquid crystal panel for forming an image by a video signal from the outside, a light source substrate comprising at least one point-like light source, and a cabinet to which the light source substrate is attached, and light emitted from the point-like light source illuminates the liquid crystal panel and the light source substrate is constructed detachably from the cabinet in a direction of a surface opposite to a display surface of the liquid crystal panel and thereby the light source substrate is constructed detachably without disassembling the liquid crystal display apparatus.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

First Embodiment

An embodiment of a liquid crystal display apparatus according to the invention will be described based on the drawings. The same numerals attached in each drawing, substantially show similar constitutional elements.

Figure 1:
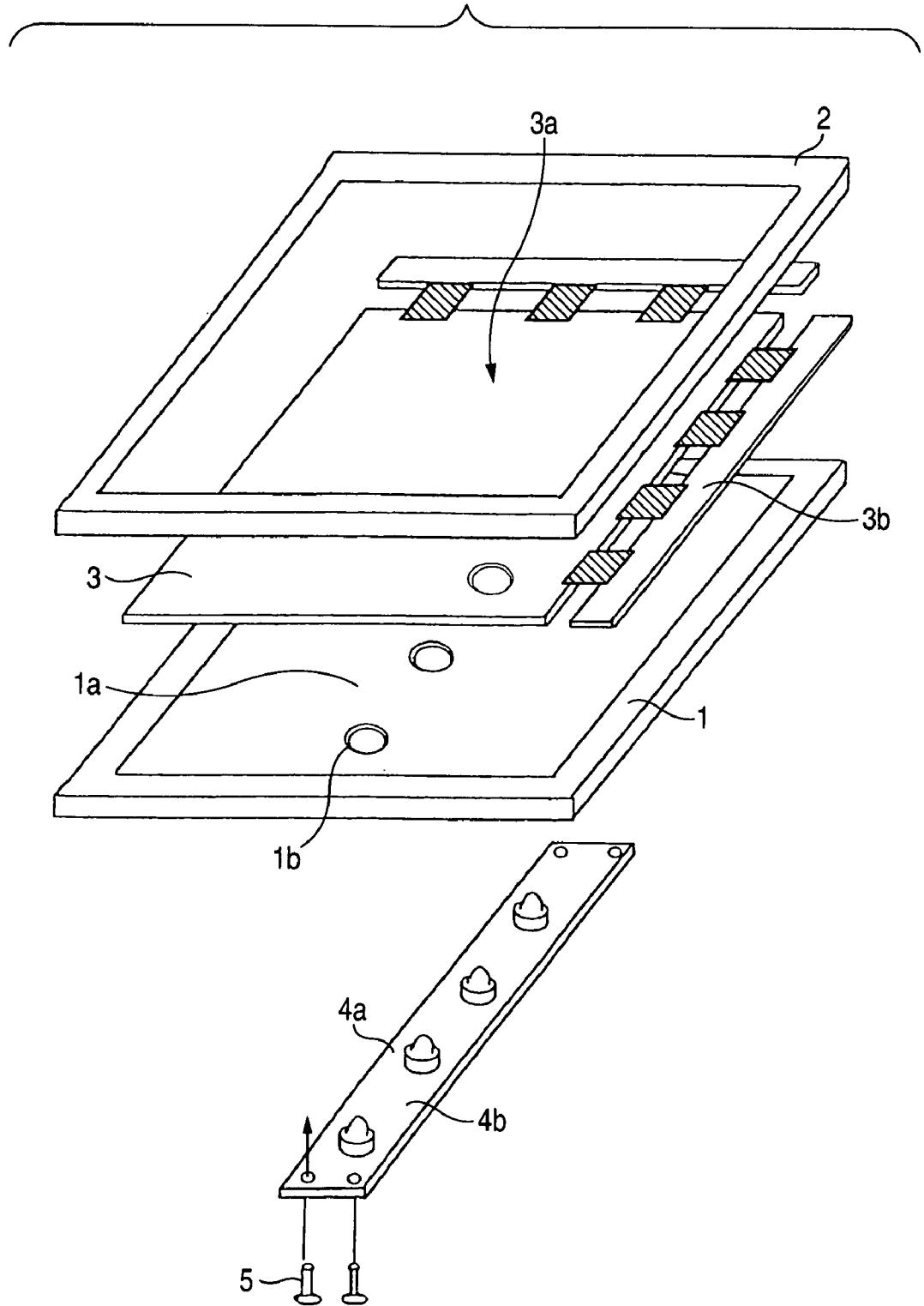
FIG. 1 is an exploded perspective view of a liquid crystal display apparatus according to a first embodiment of the invention.

FIG. 1 is an exploded perspective view showing a schematic configuration of one example of a liquid crystal display apparatus according to the invention. In FIG. 1, a cabinet 1 is a cabinet having an opening 1a and holes 1b for point-like light sources in the bottom with respect to the opening 1a, and is made of plastics or metal such as aluminum or stainless steel.

The cabinet 1 may be constructed as one member and also may be constructed by combining plural members as necessary. The cabinet 1 has a structure in which by combination with a frame 2, a liquid crystal panel 3 for forming an image by a video signal from the outside and a circuit substrate 3b constructed in the periphery are received and also a light source substrate 4b is held. The frame 2 is generally made of metal such as aluminum or stainless steel. Also, a diffusion sheet, a prism sheet, an optical sheet such as a polarization reflection sheet or a plate-shaped diffusion member in order to improve display performance may be arranged between the cabinet 1 and the liquid crystal panel 3 located on the cabinet opening 1a, but is omitted.

The liquid crystal display panel 3 in which liquid crystal is injected between a pair of glass substrates is sealed by a sealant, and further is constructed of polarization plates laminated on the respective glass substrates, and has a display surface 3a. Further, in order to drive the liquid crystal display panel 3, generally, an IC chip etc. are mounted directly on the liquid crystal display panel 3 or on a flexible substrate connected to the liquid crystal display panel 3 and further the circuit substrate 3b is arranged in their peripheries as necessary.

Point-like light sources 4a are mounted on the substrate 4b by combination or selection as usage from point-like light sources such as light emitting diodes for emitting light of white color, red color, green color, blue color or color between their colors and are formed as the light source substrate 4b. Then, the light source substrate 4b is attached to the bottom of the cabinet 1 from the outside by screws 5 from a direction opposite to the cabinet opening 1a and with that, the point-like light sources 4a pass the holes 1b for point-like light sources from the outside of the cabinet 1 to the inside and are arranged in the bottom portion of the cabinet 1. That is, in the present embodiment, the light source substrate 4b is attached to the back side of a surface of the cabinet 1 opposed to a surface opposite to the display surface 3a of the liquid crystal panel 3, so that an effect capable of easily attaching and detaching the light source substrate 4b to and from the cabinet 1 is obtained.

Based on the structure described above, an operation of the liquid crystal display apparatus in the embodiment of the invention will be described below using FIG. 2 which is a sectional view of the liquid crystal display apparatus shown in FIG. 1.

Figure 2:
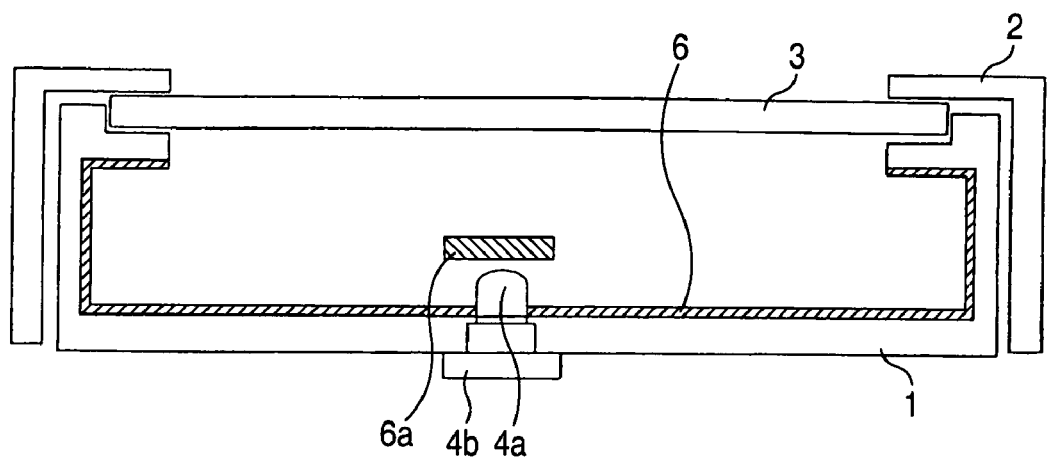
FIG. 2 is a sectional view of the liquid crystal display apparatus according to the first embodiment of the invention.

In FIG. 2, a part of light emitted from the point-like light sources 4a on the light source substrate 4b is directly applied to the back of the liquid crystal panel display surface 3a and the other light is also reflected by a member 6 which has reflecting properties and is arranged on the bottom and the sides of the cabinet 1 in a direction of the cabinet opening 1a and the liquid crystal panel 3 is applied from the back of the display surface 3a through an optical sheet or a diffusion sheet (not shown) arranged between the cabinet opening 1a and the liquid crystal panel 3 and thereby an image according to a video signal is displayed on the liquid crystal panel display surface 3a.

Figure 3:
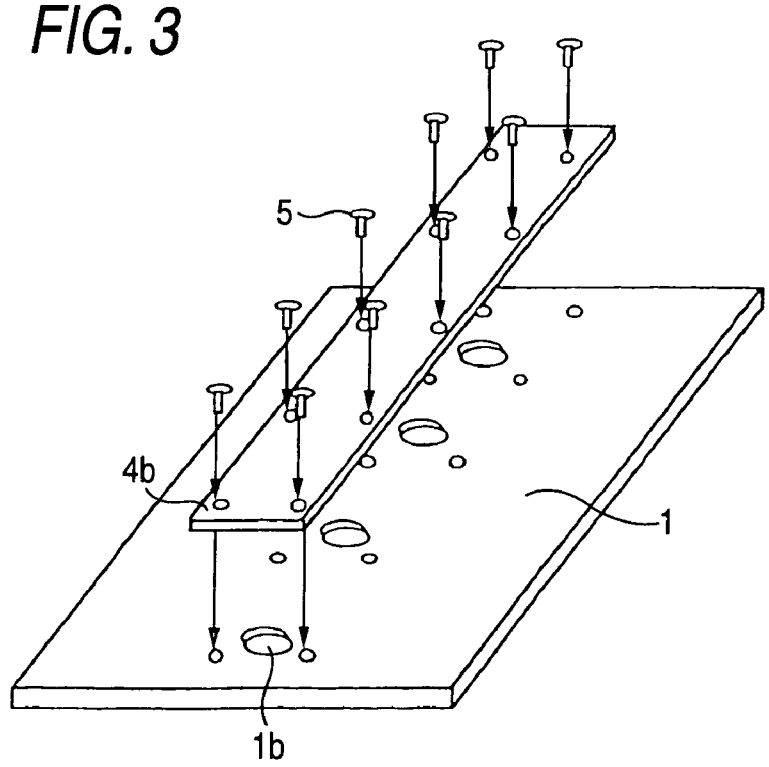
FIG. 3 is a view showing a light source substrate attachment method according to the first embodiment of the invention.
Figure 4:
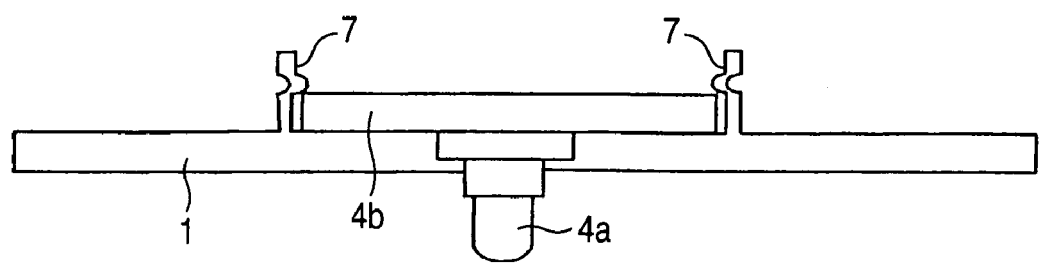
FIG. 4 is a view showing another light source substrate attachment method according to the first embodiment of the invention.

Next, a specific shape of a structure of attachment of the light source substrate 4b in the embodiment to the rear of the outside of the cabinet 1 is shown in FIG. 3. As means for attaching the light source substrate 4b to the rear of the cabinet 1, by using screwed fixing by screws 5 as shown in FIG. 3, attachment and detachment of only the light source substrate 4b can easily be performed by detaching the screws 5 without disassembling the liquid crystal display apparatus itself. Another example of the embodiment is shown in FIG. 4. The rear of the cabinet 1 is provided with engagement parts 7 shown in FIG. 4. In the case of attaching the light source substrate 4b to the cabinet 1, the light source substrate 4b is fitted in the engagement parts 7. In the case of detaching, the light source substrate 4b is detached from the engagement parts 7. By adopting a structure for attaching the light source substrate 4b to the rear of the cabinet 1 thus, the light source substrate 4b can more easily be attached and detached to and from the cabinet 1. Incidentally, a structure of attachment of the light source substrate 4b in the embodiment to the cabinet is not limited to the example described above as long as the structure of attachment is a structure in which the light source substrate 4b is fixed in the cabinet 1 with sufficient strength and disassembly, attachment and detachment can easily be performed to the rear side of the cabinet 1.

Also, in the embodiment, the light source substrate 4b has been arranged in the vicinity of the center of a direction of a short side in FIG. 1, but a position in which point-like light sources are arranged, an arrangement direction and the number of arrangements can be selected arbitrarily according to required product specifications, required optical performance. Also, an optical reflective member 6a may be disposed above the point-like light sources 4a and this case is desirable since emission of light directly from the point-like light sources 4a just above is suppressed and uniform luminance distribution can be obtained within the display surface.

Second Embodiment

Figure 5:
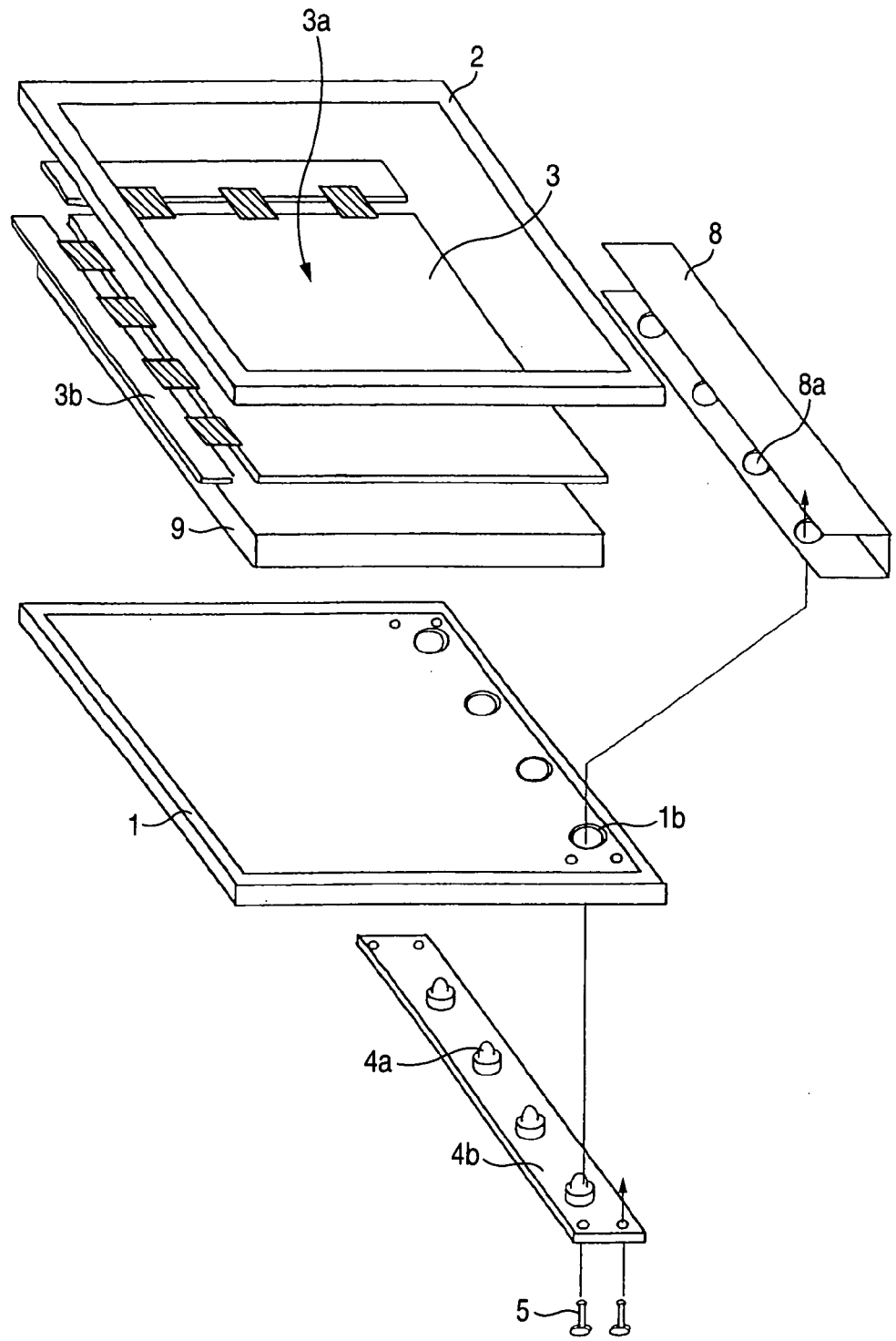
FIG. 5 is an exploded perspective view of a liquid crystal display apparatus according to a second embodiment of the invention.

An exploded perspective view of a liquid crystal display apparatus according to a second embodiment of the invention is shown in FIG. 5.

In the present embodiment, there are an LED light source substrate 4b arranged along at least one side of the inside of a cabinet 1 and a reflector 8 for surrounding the light source substrate 4b and adjacent to the reflector 8, an optical waveguide 9 is further provided between the cabinet 1 and a liquid crystal panel 3. Generally, a sheet-shaped or plate-shaped member having reflecting properties is inserted between the optical waveguide 9 and the cabinet 1 (not shown). The other configuration is the same as that of the first embodiment and the light source substrate 4b is attached from the outside to the backside of a surface of the cabinet 1 opposed to a surface opposite to a display surface 3a of the liquid crystal panel.

Figure 6:
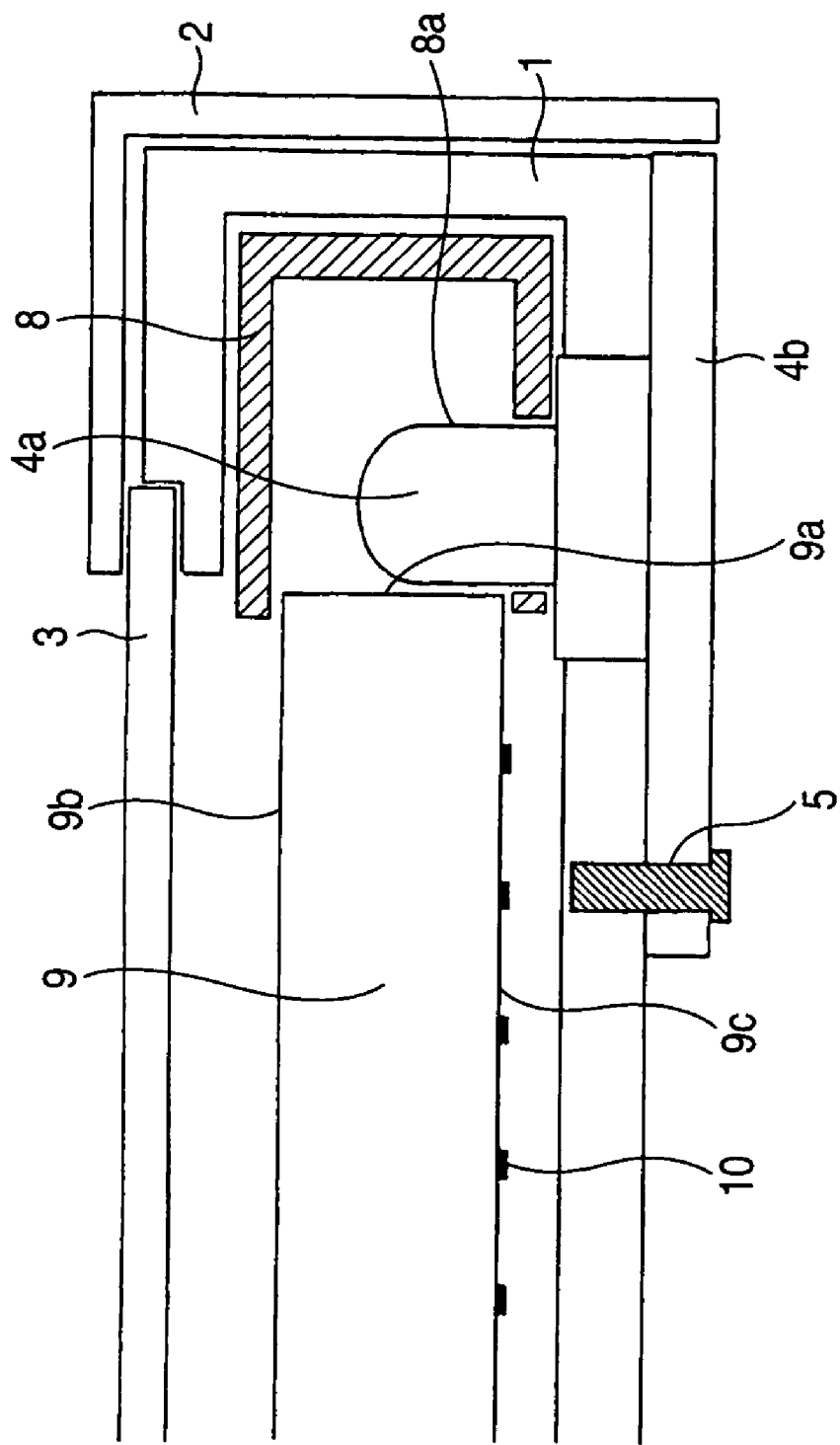
FIG. 6 is a sectional view of a part of the liquid crystal display apparatus according to the second embodiment of the invention.

An expanded view of a structure of the point-like light source periphery in the embodiment is shown in FIG. 6. The reflector 8 comprises holes 8a corresponding to positions of point-like light sources 4a in a manner similar to the rear of the cabinet 1 and the point-like light sources 4a are arranged inside the reflector 8 through the holes 8a and the reflector 8 is formed in such a form as to surround the peripheries of the point-like light sources 4a as shown in FIG. 6. A part of light emitted from the point-like light sources 4a is directly launched from an end face 9a of the optical waveguide 9 adjacent to the side in which the point-like light sources 4a are arranged, and a part of the light is reflected by the reflector 8 and is launched from the end face 9a.

The light launched into the optical waveguide 9 spreads and propagates through the optical waveguide 9 while repeating total reflection between a surface 9b near the side of the liquid crystal panel 3 of the optical waveguide 9 and a back surface 9c near the side of the cabinet 1. In a process of this propagation, a part of the incident light is scattered by a pattern 10 provided on at least one surface of the back surface 9c of the optical waveguide or the surface 9b of the optical waveguide and exceeds a critical angle and is emitted from the surface 9b near the side of the liquid crystal panel 3 of the optical waveguide 9 and the liquid crystal panel 3 is illuminated from the back of the display surface 3a. By adopting the structure comprising the optical waveguide 9 thus, while having effects in which the light emitted from the point-like light sources 4a can be diffused effectively by the pattern 10 provided on the optical waveguide 9 and it is easy to obtain desired luminance distribution and also a liquid crystal display apparatus can be thinned, the effect capable of easily attaching and detaching the light source substrate 4b in which the point-like light sources 4a are mounted without disassembling the liquid crystal display apparatus is obtained in a manner similar to the first embodiment.

In the embodiment, in order to increase efficiency of light utilization by reflection of the reflector 8, it is desirable to use a structure in which the peripheries of the point-like light sources 4a are covered with the reflector 8 as much as possible, and it is desirable to provide the holes 8a of the minimum dimensions in the reflector in correspondence with the point-like light sources 4a as described above.

Also, as another form in the embodiment, the same configuration as that of the reflector 8 may be provided by configuring the cabinet 1 with a member with high reflectance. Also, as material configuring the reflector 8, a sheet-shaped member or metal having regular reflection or diffusion reflecting properties may be used and material by their combinations may be used.

Third Embodiment

Figure 7:
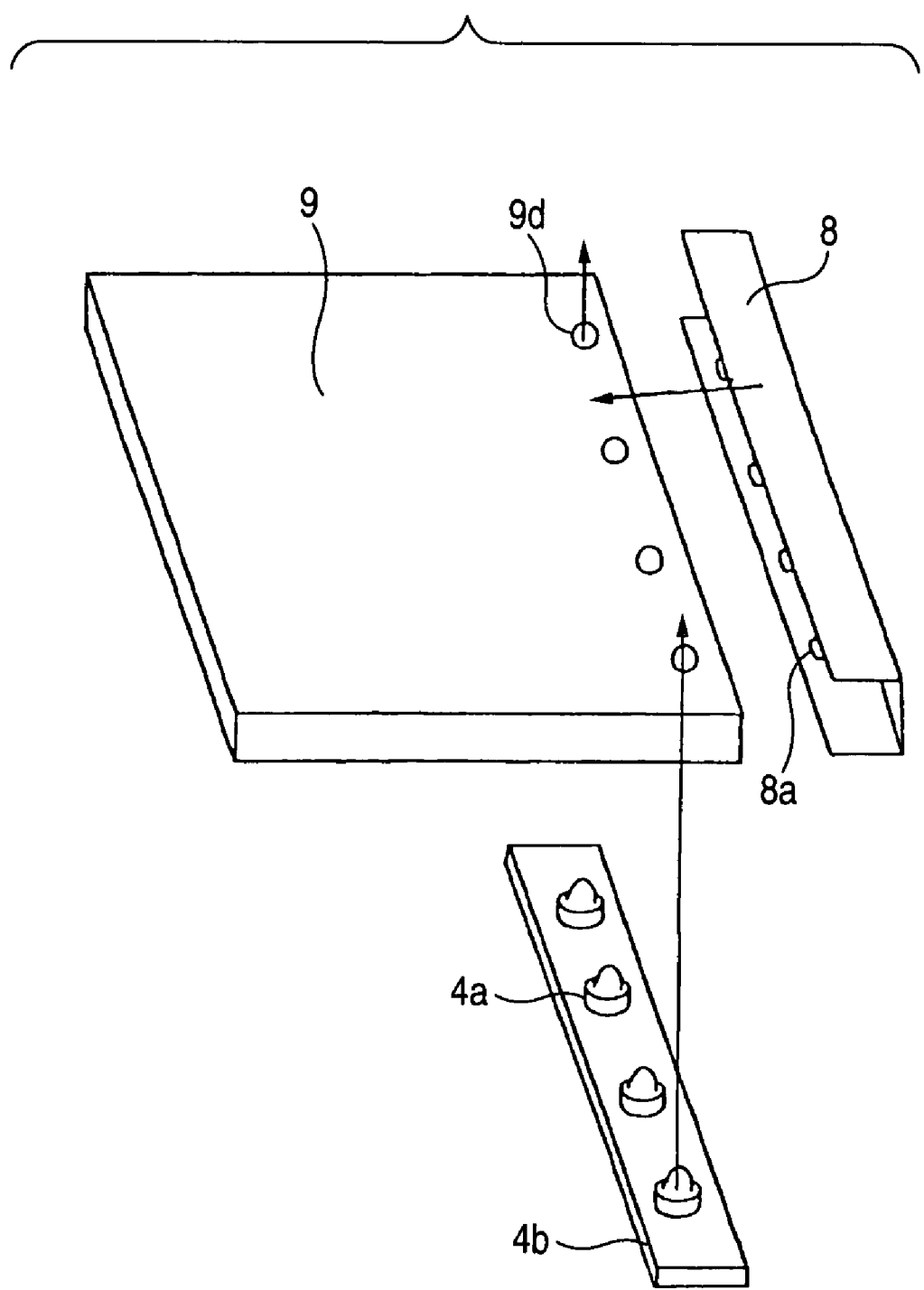
FIG. 7 is an exploded perspective view of a part of a liquid crystal display apparatus according to a third embodiment of the invention.

An exploded perspective view of a liquid crystal display apparatus according to a third embodiment of the invention is shown in FIG. 7. In the present embodiment, an optical waveguide 9 comprises through holes 9d in positions corresponding to each of the point-like light sources 4a mounted in a light source substrate 4b and each of the point-like light sources 4a is arranged in a form received inside the through holes 9d. In the periphery of the optical waveguide 9, a reflector 8 shown in FIG. 7 is arranged in such a form as to surround the periphery of a portion in which the point-like light sources 4a of the optical waveguide 9 are received. The reflector 8 is also provided with holes 8a in positions corresponding to each of the point-like light sources 4a and each of the point-like light sources 4a is received inside the through holes 9d of the optical waveguide 9 in a form passing through the holes 8a. The other configuration is similar to that of the second embodiment.

Figure 8:
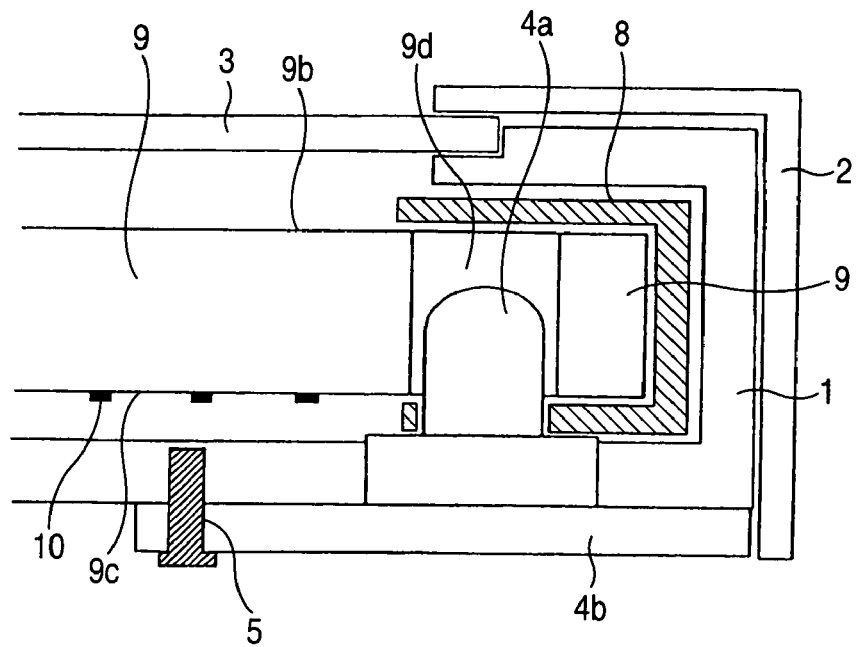
FIG. 8 is a sectional view of the liquid crystal display apparatus according to the third embodiment of the invention.

A sectional view of an LED light source periphery structure in the embodiment is shown in FIG. 8. In the embodiment, light emitted from the point-like light sources 4a is directly launched from surfaces forming inner circumferences of the through holes 9d provided in the optical waveguide 9 and propagates through the optical waveguide 9. The propagation through the optical waveguide 9 and emission from the optical waveguide 9 are similar to those of the second embodiment. In a process of light incidence on the optical waveguide 9, most of the light emitted from the point-like light sources 4a is directly launched into the optical waveguide 9 without repeating reflection by the reflector 8, so that light efficiency higher than that of the case of using the reflector 8 can be obtained.

Figure 9:
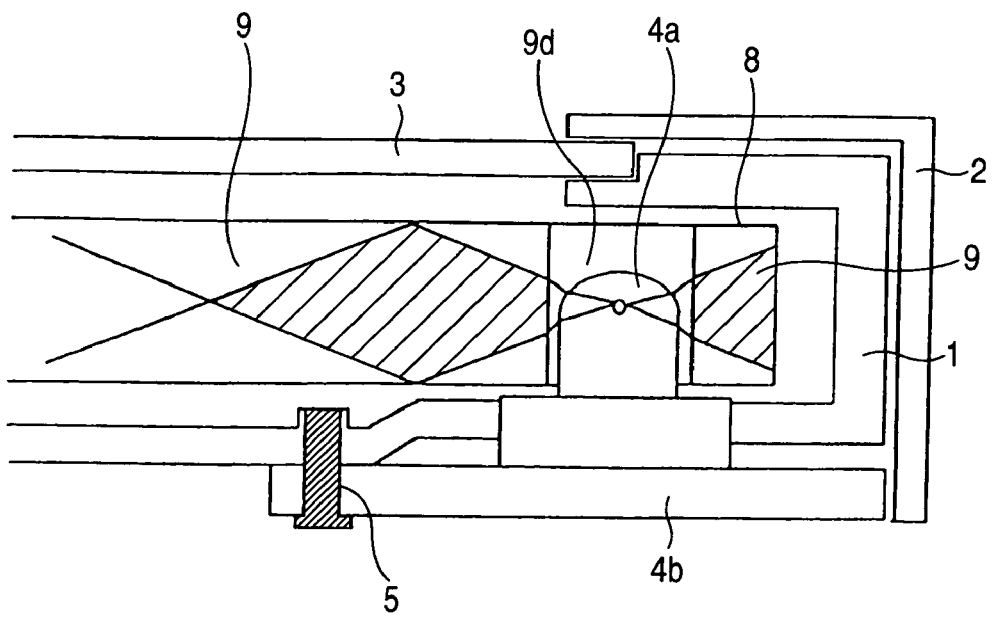
FIG. 9 is a sectional view of the liquid crystal display apparatus according to the third embodiment of the invention.

Also, when light sources having directivity in a direction of a surface parallel to the surfaces 9b, 9c of the optical waveguide 9 are used as the point-like light source 4a in the structure of FIG. 8, light emitted from the point-like light sources 4a is directly launched into the optical waveguide 9 in substantially parallel with the surfaces 9b, 9c as shown in FIG. 9. As a result of that, the need for the reflector 8 required to guide the light to the optical waveguide 9 by reflecting the light from the light sources can be eliminated and there are merits of reduction in member cost and improvement in assembly workability.

Figure 10:
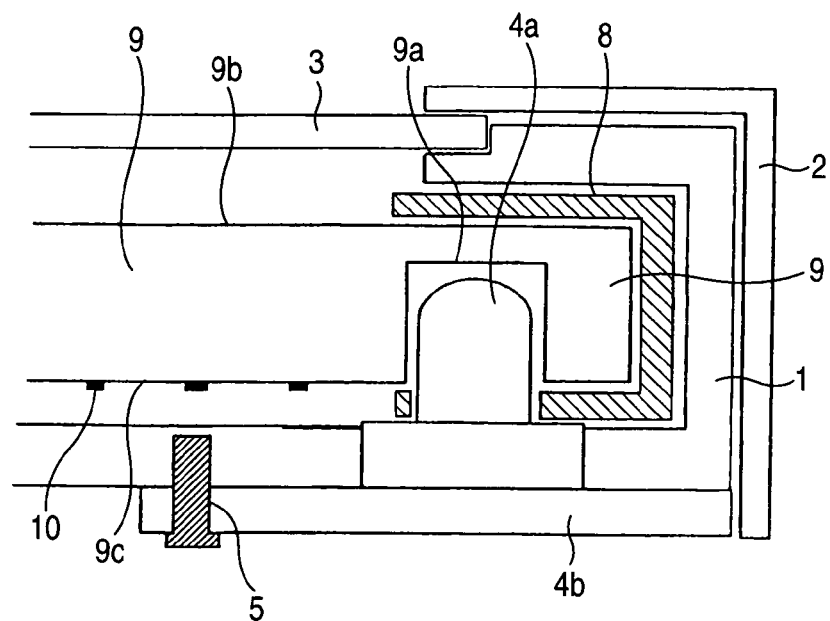
FIG. 10 is a sectional view of the liquid crystal display apparatus according to the third embodiment of the invention.

In the embodiment, the optical waveguide 9 having the through holes 9d in which the point-like light sources 4a are received has been described, but a recess 9e may be provided instead of the through holes 9d as shown in FIG. 10. Also in this structure, light sources having directivity in a direction of a surface parallel to the surfaces 9b, 9c of the optical waveguide 9 may be used and the reflector 8 may be omitted.

As another form in the embodiment, the same effect as that of the reflector may be provided by configuring the cabinet by a reflective member. Also, a reflector may be configured by forming reflective material in sheet shape.

In the embodiment, by setting means for attaching the light source substrate 4b to the rear of the cabinet 1 similar to the first embodiment, effects in which only the light source substrate 4b can be attached and detached easily without disassembling the liquid crystal display apparatus body while obtaining high efficiency of light utilization using the point-like light sources 4a as light sources are obtained.

Fourth Embodiment

In the first to third embodiments, the arrangement and the structure of the point-like light sources and the periphery have been described. The present embodiment is characterized in that a light source substrate 4b is constructed of material including metal.

In a point-like light source such as an LED, when a current is increased in order to increase light emission intensity, a temperature rise by heat generation occurs and due to this temperature rise, luminance decrease or wavelength variation occurs and stable display properties are inhibited. In order to prevent this temperature rise and obtain the stable display properties, it is desirable to increase efficiency of heat dissipation from the point-like light source such as the LED and improve efficiency of light emission of the point-like light source. In the invention, the light source substrate 4b in which point-like light sources 4a are mounted is constructed of material including metal and thereby, heat generated in the point-like light sources 4a transfers to the light source substrate 4b and heat dissipation properties can be improved, so that the efficiency of light emission of the point-like light sources 4a can be improved.

Further, both of the light source substrate 4b and a cabinet 1 are constructed of material including metal and the light source substrate 4b is arranged in close contact with the cabinet 1 and thereby, the heat dissipation properties can be improved more and the efficiency of light emission of the point-like light sources 4a can be improved. Here, the material including metal may be metal. Also, when surface protection or electrical insulation is required, the material may be a member in which a thin insulating film such as a resin sheet or an oxide film is formed on a surface of metal. Incidentally, in the embodiment, material including metal with characteristics of excellent thermal conductivity is selected, but the material is not limited to metal as material as long as thermal conductivity is good. For example, the material may be material including conductive resin or conductive oxide.

Fifth Embodiment

Figure 11:
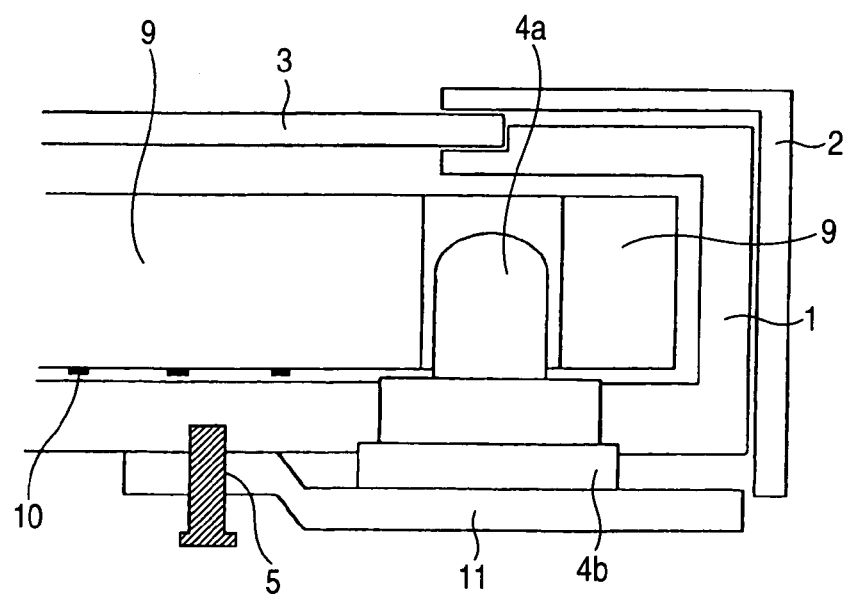
FIG. 11 is a sectional view of a liquid crystal display apparatus according to a fifth embodiment of the invention.

A sectional view in the vicinity of a point-like light source in one embodiment of a liquid crystal display apparatus according to the invention is shown in FIG. 11. In the present embodiment, as shown in FIG. 11, a support frame 11 of a light source substrate 4b is provided in the rear side corresponding to the side opposite to a surface in which point-like light sources 4a are mounted in the light source substrate 4b and the support frame 11 is fixed in the rear of the outside of a cabinet 1. The support frame 11 is a plate-shaped member made of plastics or metal such as aluminum or stainless steel. The other configuration is the same as that of the fourth embodiment.

In the case of attaching the light source substrate 4b to the cabinet 1 through the support frame thus, since the need to change specifications of the light source substrate according to a kind of the liquid crystal display apparatus is eliminated by optimizing a shape of the support frame, attachment corresponding to individual liquid crystal display apparatus can be performed and a general-purpose component of the light source substrate can be used properly, so that manufacturing cost of the liquid crystal display apparatus can be reduced.

Also, in the embodiment, an effect capable of tightly attaching the light source substrate 4b to the cabinet 1 without depending on strength or rigidity of the light source substrate itself is also obtained by attaching the light source substrate 4b to the cabinet 1 through the support frame 11. When the support frame 11 is made of metal, attachment to the cabinet 1 can be performed more tightly.

Further, when the support frame 11 is made of metal, thermal conductivity is good, so that efficiency of light emission of the point-like light sources 4a can be improved by efficiently dissipating heat generated in the point-like light sources 4a to the cabinet 1 through the light source substrate 4b and the support frame 11.

As shown in FIG. 11, when the light source substrate 4b is attached to the cabinet 1 through the support frame 11, a region (for example, a screw hole) for attachment to the rear of the cabinet 1 is not required in the light source substrate 4b, so that an outer shape of the light source substrate 4b can be miniaturized more. In this case, the support frame 11 is fixed in the rear of the cabinet 1 by a screw 5 and the light source substrate 4b may be fixed so as to be pushed on the cabinet 1 by the support frame 11 or the light source substrate 4b may be bonded to the support frame 11 by adhesive etc.

Figure 12:
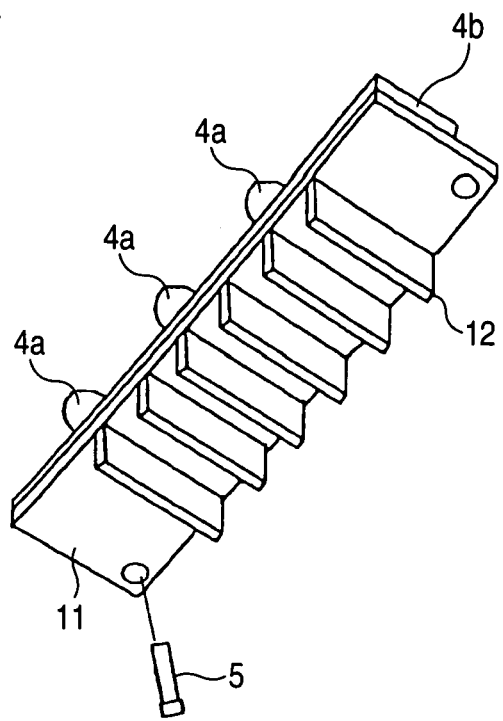
FIG. 12 is one example of a support frame according to the fifth embodiment of the invention.

Further, heat generation from the point-like light sources 4a can be dissipated more effectively by forming a part of the support frame 11 in fin shape 12 as shown in FIG. 12.

Sixth Embodiment

Figure 13:
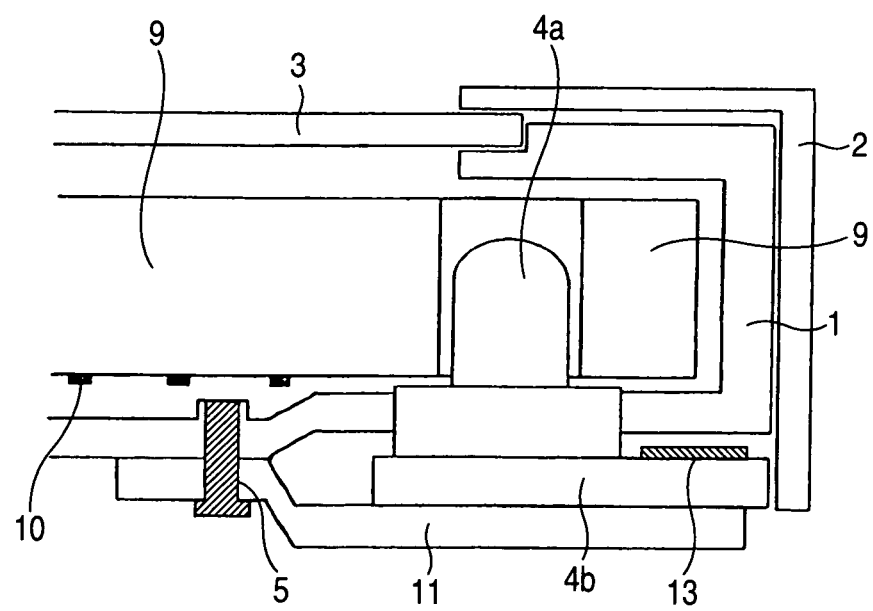
FIG. 13 is a sectional view of a liquid crystal display apparatus according to a sixth embodiment of the invention.

A sectional view showing a schematic configuration of one embodiment of a liquid crystal display apparatus according to the invention is shown in FIG. 13. In the present embodiment, a circuit pattern 13 for lighting point-like light sources 4a is formed in a place other than a region in which a light source substrate 4b makes contact with a cabinet 1. The other configuration is the same as that of the first to fifth embodiments.

As shown in FIG. 13, the circuit pattern 13 is not wired in a region in which the light source substrate 4b makes contact with the cabinet 1 and thereby, an insulating layer of a contact region with the cabinet 1 can be eliminated and a contact pressure with the circuit pattern 13 can also be eliminated.

Figure 14:
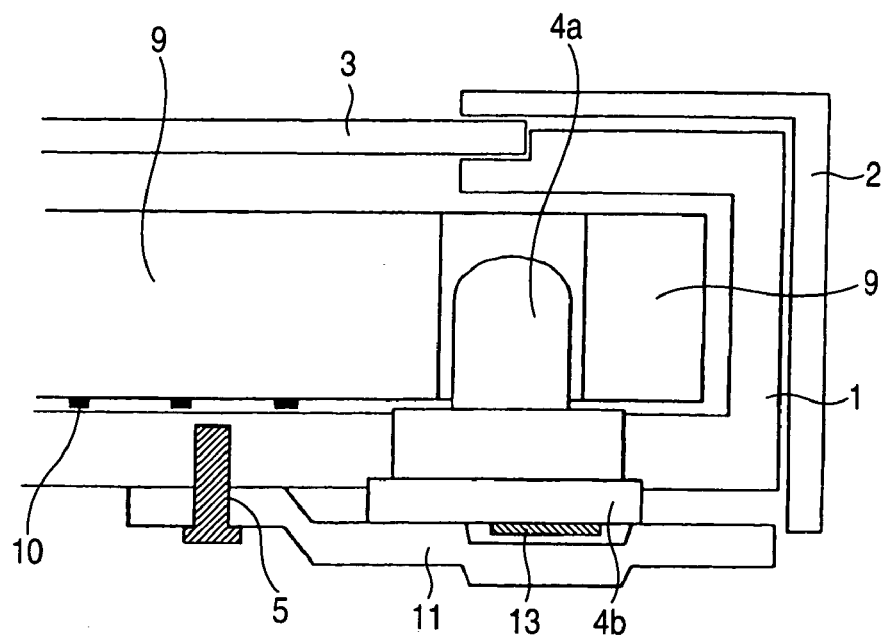
FIG. 14 is a sectional view of the liquid crystal display apparatus according to the sixth embodiment of the invention.
Figure 15:
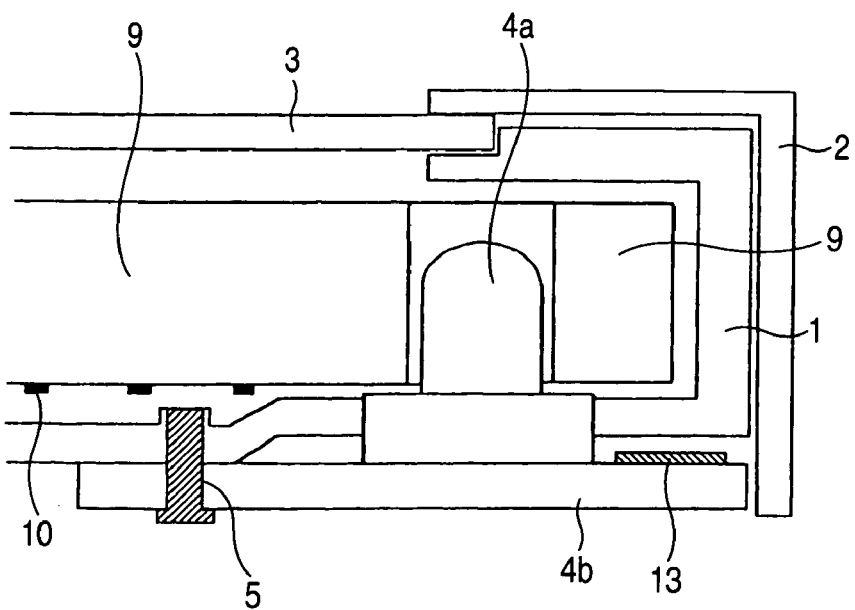
FIG. 15 is a sectional view of the liquid crystal display apparatus according to the sixth embodiment of the invention.

Further, when the light source substrate 4b is made of metal as shown in the fourth embodiment, attachment to the cabinet 1 can be performed directly without intervention of an insulating layer, so that thermal conduction between the light source substrate 4b and the cabinet 1 can be improved and heat generation from the point-like light sources 4a can effectively be dissipated to the side of the cabinet 1. Also, as shown in FIG. 14, it may be a structure in which the circuit pattern 13 is formed in a place other than a region in which the light source substrate 4b makes contact with a support frame 11. In this structure, the support frame 11 is provided with a depression so as not to make contact with the circuit pattern 13, so that even when the circuit pattern 13 is arranged in a surface opposite to the point-like light sources 4a, heat generation of the point-like light sources 4a can be dissipated to the cabinet side by making contact with a region other than the circuit pattern 13. Further, as shown in FIG. 15, when there is no support frame, the embodiment is applied and similar effect can be obtained.

Seventh Embodiment

Figure 16:
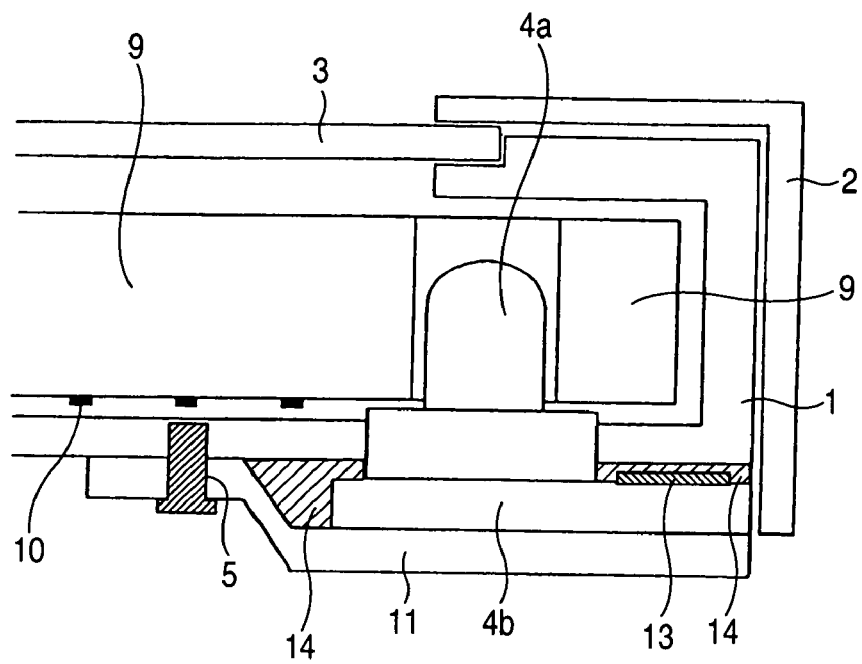
FIG. 16 is a sectional view of a liquid crystal display apparatus according to a seventh embodiment of the invention.

A sectional view showing a schematic configuration of one embodiment of a liquid crystal display apparatus according to the invention is shown in FIG. 16. In the present embodiment, a member 14 with good electrical insulating properties is arranged between a light source substrate 4b and a cabinet 1 as shown in FIG. 16. The other configuration is the same as that of the first to fifth embodiments.

When the cabinet 1 is made of metal, as shown in FIG. 16, the member 14 with electrical insulating properties is attached and sandwiched between the light source substrate 4b and the cabinet 1 and thereby the light source substrate 4b and a mounting part of a substrate can be prevented from making a short circuit with the cabinet 1 made of metal, so that a circuit pattern 13 for driving of a light source can also be provided in a range in which the light source substrate 4b makes contact with the cabinet 1 and there is an effect of contributing to miniaturization of the light source substrate 4b. Here, the insulating member 14 may be arranged in all or a part of the region of attachment of the light source substrate 4b to the cabinet 1.

Figure 17:
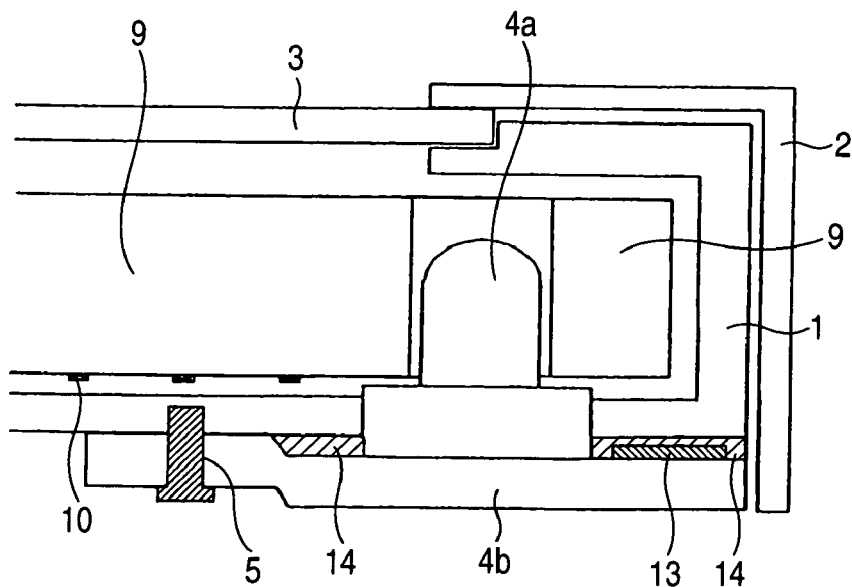
FIG. 17 is a sectional view of the liquid crystal display apparatus according to the seventh embodiment of the invention.

Also, in the embodiment, instead of the electrical insulating member, a member with good thermal conductivity may be attached and sandwiched between the light source substrate 4b and the cabinet 1. By attaching the light source substrate 4b to the cabinet 1 through the member with good thermal conductivity, heat generation from point-like light sources 4a can more effectively be dissipated to the cabinet 1 and an effect of improving efficiency of light emission of the point-like light sources 4a is obtained. Here, the member with good thermal conductivity may be arranged in all or a part of the region of attachment of the light source substrate 4b to the cabinet 1. Also, in the embodiment, a member with both of good electrical insulating properties and good thermal conductivity may be applied as a member arranged between the light source substrate 4b and the cabinet 1. Further, as shown in FIG. 17, when there is no support frame, the embodiment is applied and similar effect can be obtained.

Figure 18:
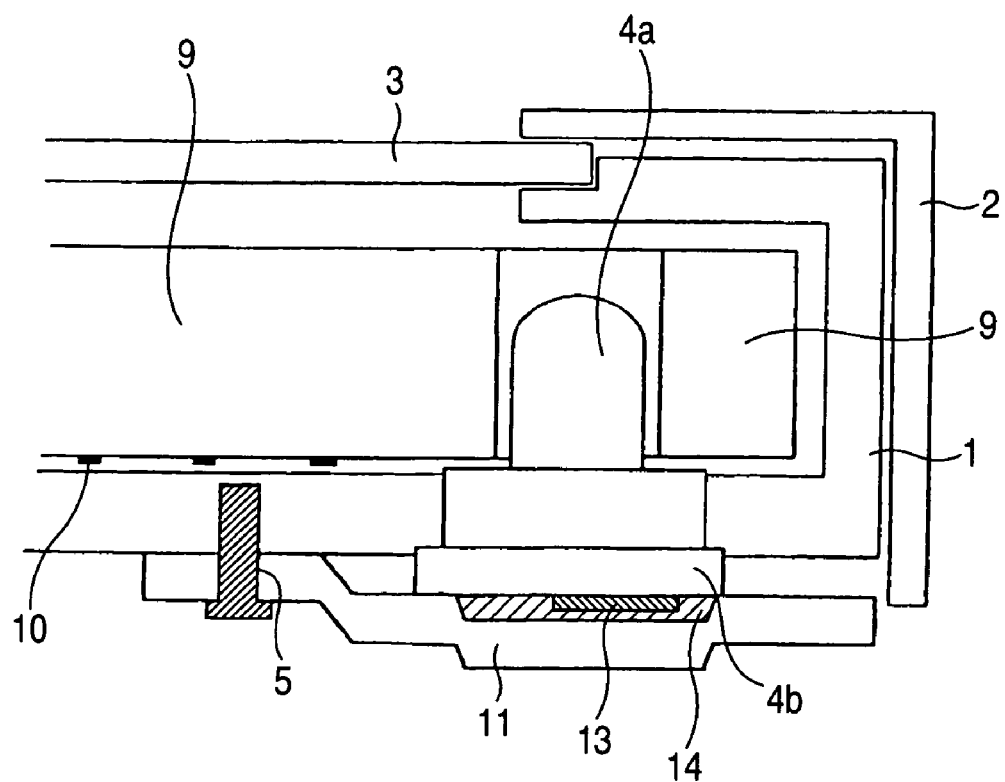
FIG. 18 is a sectional view of the liquid crystal display apparatus according to the seventh embodiment of the invention.

Also, in the embodiment, the insulating member 14 has been sandwiched between the cabinet 1 and the light source substrate 4b, but when a circuit pattern 13 is arranged in a surface opposite to the point-like light sources 4a, the insulating member 14 may be sandwiched between the light source substrate 4b and a support frame 11 as shown in FIG. 18. Also, when a member with good thermal conductivity is sandwiched between the light source substrate 4b and the support frame 11, heat generation of the point-like light sources 4a is dissipated to the cabinet 1 through the support frame 11 and an effect of improving efficiency of light emission of the point-like light sources 4a is obtained. A member with both of good electrical insulating properties and good thermal conductivity may be applied.

Eighth Embodiment

Figure 19:
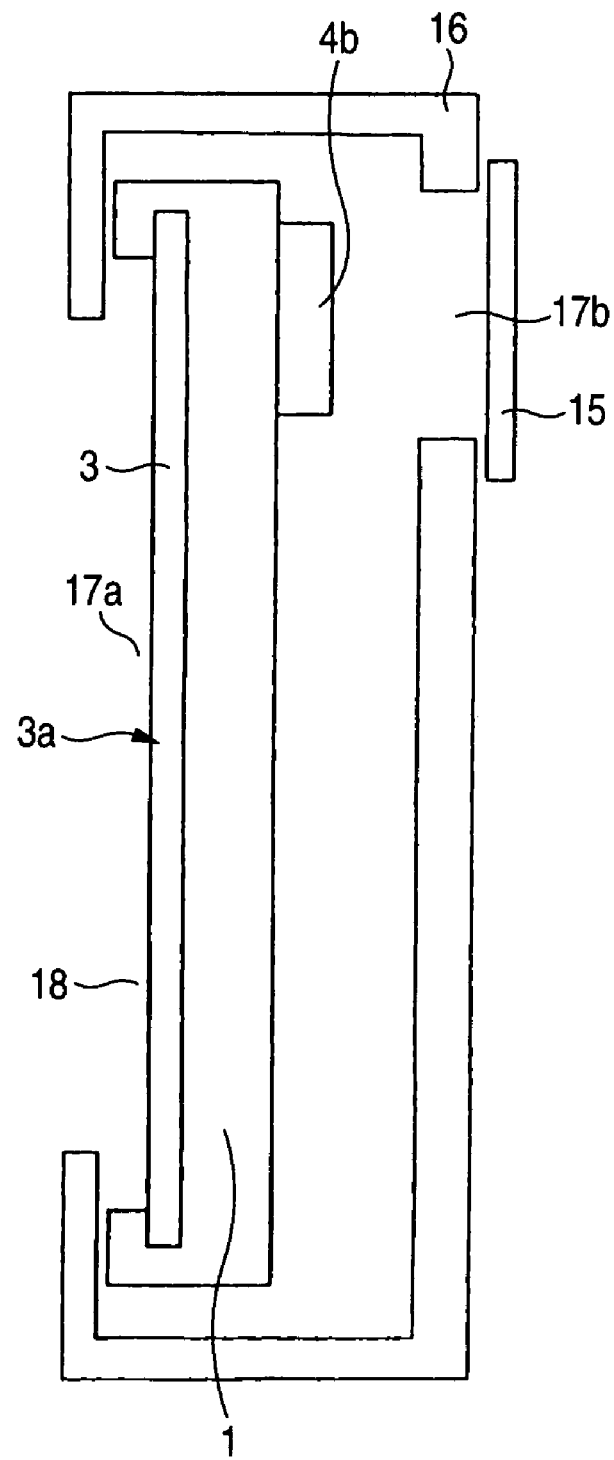
FIG. 19 is a sectional view of electronic equipment comprising a liquid crystal display apparatus according to an eighth embodiment of the invention.

A sectional view of one embodiment of electronic equipment comprising a liquid crystal display apparatus according to the invention is shown in FIG. 19. It is constructed so that a liquid crystal display apparatus 18 is incorporated into the inside of electronic equipment 16 shown in FIG. 19 so as to expose a liquid crystal panel display surface 3a to the opening 17a and an image generated by a liquid crystal panel 3 can be viewed through the opening 17a. It is characterized in that the electronic equipment 16 in the present embodiment is constructed so that an opening 17b can temporarily be formed in an outer surface opposite to the liquid crystal panel display surface 3a and the opening 17b is formed in a position corresponding to a light source substrate 4b present in the inside of the electronic equipment 16.

Generally, in the case of replacing the light source substrate 4b present in the inside of the electronic equipment 16, work in which the liquid crystal display apparatus 18 is first detached from the electronic equipment 16 and further the light source substrate 4b is detached from the liquid crystal display apparatus 18 is required. In the electronic equipment in the embodiment, the light source substrate 4b can be attached and detached directly through the opening 17b present in a direction opposite to the liquid crystal panel display surface 3a and there is no need to detach the liquid crystal display apparatus 18, so that an effect of remarkably improving workability at the time of replacing the light source substrate is obtained. Here, the opening 17b has only to be opened in a range necessary to replace the light source substrate 4b, and a position of the opening may be separate from a region corresponding to the light source substrate 4b. Also, it is desirable that the opening 17b be covered with a lid 15 or a cover, etc. at the time of use of the electronic equipment 16 and the opening 17b be temporarily opened in the case of replacing the light source substrate 4b in order to prevent damage to the liquid crystal display apparatus or intrusion of foreign matter into the electronic equipment.

What is claimed is:

1. A liquid crystal display apparatus comprising:
   a liquid crystal panel for forming an image;
   at least one point-like light source for applying light to the liquid crystal panel;
   a light source substrate for mounting the point-like light source;
   a cabinet for holding the liquid crystal panel; and
   a plate-shaped member provided outside of the light source substrate;
   wherein the light source substrate is attached from the outside to a backside surface of the cabinet opposed to a surface opposite to a display surface of the liquid crystal panel and is detachable from the outside, and
   the light source substrate is attached to the cabinet through the plate-shaped member.

2. A liquid crystal display apparatus according to claim 1, wherein each of the plate-shaped member and the cabinet comprises a screw hole into which a screw is inserted, and
   wherein the light source substrate is attached to the cabinet by inserting the screw into the screw holes.

3. A liquid crystal display apparatus according to claim 2, wherein the plate-shaped member is made of material including metal.

4. A liquid crystal display apparatus according to claim 1, wherein a circuit pattern on the light source substrate is present in only a portion other than a contact portion with the plate-shaped member.

5. A liquid crystal display apparatus according to claim 1, wherein the light source substrate is attached to the plate-shaped member through electrical insulating material or material with good thermal conductivity.

6. A liquid crystal display apparatus according to claim 1, wherein the point-like light source is arranged in alignment along a direction that is substantially parallel with one side of the liquid crystal panel, and
   wherein a size of the light source substrate is set such that the light source substrate opposes at least one area of the liquid crystal panel.

7. A liquid crystal display apparatus according to claim 1, further comprising:
   an optical waveguide for guiding light emitted from the point-like light source to the liquid crystal panel,
   wherein the optical waveguide is provided between the liquid crystal panel and the cabinet.

8. A liquid crystal display apparatus according to claim 7, wherein the optical waveguide has a recess or a through hole and the point-like light source is received in the recess or the through hole.

9. A liquid crystal display apparatus according to claim 8, wherein the recess or the through hole is arranged in alignment along at least one side of the optical waveguide.

10. A liquid crystal display apparatus according to claim 7, wherein the light source substrate is made of material including metal.

11. A liquid crystal display apparatus according to claim 7, wherein a circuit pattern on the light source substrate is present in only a portion other than a contact portion with the cabinet.

12. A liquid crystal display apparatus according to claim 7, wherein the light source substrate is attached to the cabinet through electrical insulating material or material with good thermal conductivity.

13. A liquid crystal display apparatus according to claim 1, wherein the point-like light source is a LED.

14. An electronic equipment comprising
    the liquid crystal display apparatus according to claim 1.

15. An electronic equipment according to claim 14, further comprising:
    a mechanism temporarily opening an outer surface of a place corresponding to a position of at least the light source substrate in electronic equipment in which the liquid crystal display apparatus is incorporated into the inside.

* * * * *